US 8,953,181 B2

(12) United States Patent
Oba et al.

(10) Patent No.: US 8,953,181 B2
(45) Date of Patent: Feb. 10, 2015

(54) VIRTUAL PRINT JOB PREVIEW AND VALIDATION

(75) Inventors: Kazutaka Oba, Johns Creek, GA (US); Ulrich Wehner, Lawrenceville, GA (US)

(73) Assignee: Ricoh Company, Ltd., Tokyo (JP)

( * ) Notice: Subject to any disclaimer, the term of this patent is extended or adjusted under 35 U.S.C. 154(b) by 887 days.

(21) Appl. No.: 12/763,641

(22) Filed: Apr. 20, 2010

(65) Prior Publication Data

US 2011/0255111 A1    Oct. 20, 2011

(51) Int. Cl.
*G06F 3/12* (2006.01)
(52) U.S. Cl.
CPC ............ *G06F 3/1285* (2013.01); *G06F 3/1208* (2013.01); *G06F 3/1247* (2013.01); *G06F 3/1256* (2013.01); *G06F 3/1242* (2013.01)
USPC ........................................ 358/1.13; 358/1.15
(58) Field of Classification Search
USPC .................. 358/1.13, 1.16, 1.17; 715/255
See application file for complete search history.

(56) References Cited

U.S. PATENT DOCUMENTS

| | | | | |
|---|---|---|---|---|
| 6,288,789 | B1 * | 9/2001 | Harada | 358/1.15 |
| 6,607,258 | B2 * | 8/2003 | Jodra et al. | 347/15 |
| 7,623,253 | B1 * | 11/2009 | Oyama et al. | 358/1.14 |
| 2002/0046238 | A1 * | 4/2002 | Estavillo et al. | 709/203 |
| 2002/0131070 | A1 * | 9/2002 | Housel et al. | 358/1.15 |
| 2003/0174357 | A1 * | 9/2003 | Lester et al. | 358/1.15 |
| 2007/0233834 | A1 | 10/2007 | Hattori et al. | |
| 2008/0231886 | A1 | 9/2008 | Wehner et al. | |
| 2012/0081741 | A1 * | 4/2012 | Iida | 358/1.15 |
| 2013/0335756 | A1 * | 12/2013 | Bhaskaran et al. | 358/1.9 |

* cited by examiner

*Primary Examiner* — Mark Zimmerman
*Assistant Examiner* — Lawrence Wills
(74) *Attorney, Agent, or Firm* — Cooper & Dunham LLP

(57) ABSTRACT

Apparatuses, systems and methods are provided for previewing and submitting print jobs. A printer apparatus generates and outputs preview data based on printer resources and print data received from an external terminal, in response to a preview request received along with the print data from the external terminal. Such preview data is in a printer-independent format that is acceptable to a plurality of printing devices, and images generated by the plurality of printers based on the preview data are substantially the same.

17 Claims, 13 Drawing Sheets

200A

VIRTUAL PRINT JOB PREVIEW AND VALIDATION

TECHNICAL FIELD

This disclosure relates to systems, apparatuses and methodologies for previewing and submitting print jobs.

BACKGROUND

In the current information age, printing devices including traditional printers and Multi-Function Products (MFPs) have become extensively used in enterprise and other organization environments. Various computing devices such as user terminals may be connected to a printer, in order to transmit a print job to the printer.

Conventionally, when a user of a terminal wishes to submit a print job of a document to a printer, the user may first be presented with a print preview of the document on a display unit of the terminal, before the print job is submitted to the printer. The print preview is intended to provide a representation of what a completed hardcopy printout of the document may look like if the print job is submitted to the printer. In this way, the user may determine if a hardcopy printout of the document will have the intended presentation, with respect to the text, images, formatting and margins of the document, as well as other aspects of the document.

However, there is a drawback in that a conventional print preview is generated by an application operating on the user's terminal, such as a print driver application or the application that was employed by the user to create the document. Thus, the conventional print preview is generated using only the resources of the terminal, and the actual print job and associated print data is not submitted to the printer until after the print preview has been generated and displayed by the terminal.

As a result, the conventional print preview is not generated using the resources of the printer, even though the actual hardcopy printout of the document will be formed with the resources of the printer. For example, the final document may include printer fonts, forms, logos, letterhead, overlays, signatures, barcodes, banners, and other elements generated by the resources of the printing device. Thus, the conventional print preview does not provide the user with an accurate representation of what the final hardcopy printout of the document will look like after these resources of the printer are applied.

As a further example, if the user wishes to submit a print job of a color document, the conventional print preview will display a preview of the color document. However, if the printer can only print in monochrome, or the user then selects a monochrome setting of the printer for the print job or a low-ink 'economy' setting of the printer for the print job, the conventional print preview simply does not provide a representation of what the final hardcopy printout of the document will look like after these resources of the printer are applied.

There exists a need for an improved approach for previewing and submitting print jobs, using techniques that are efficient and not as difficult to use (as a practical matter).

SUMMARY

This disclosure provides tools (in the form of systems, apparatuses and methodologies) for previewing and submitting print jobs.

In an aspect of this disclosure, a printer apparatus is provided which includes a preview request receiving part configured to receive a preview request along with print data from an external terminal, a resource collection part configured to collect printer resources in accordance with the received preview request and print data, and a preview data generation part configured to render and output preview data based on the received print data and the collected printer resources applied to the print data, wherein the preview data output by the preview data generation part is in a printer-independent format that is acceptable to a plurality of printing devices, and images generated by the plurality of printers based on the preview data are substantially the same.

In another aspect, preview data output by a preview data generation part of a printer apparatus can include data configured to be transmitted to a print drum, and images generated by a plurality of printers based on the preview data are substantially the same as a hardcopy image generated by the printer apparatus based on the preview data.

In another aspect, a preview data storage part of a printer apparatus stores preview data output by a preview data generation part of the printer apparatus until an instruction to delete the preview data from the preview data storage part is received, and when the printer apparatus receives, after the preview data has been output, a print job corresponding to the print data, the printer apparatus retrieves the stored preview data and generates a hardcopy output based on the retrieved preview data, in response to the received print job.

In another aspect, preview data output by a preview data generation part of a printer apparatus is stored in a preview data storage part, and the preview data stored in the storage part is deleted only after at least one of the following events occur: (i) the printer apparatus retrieves the stored preview data and generates a hardcopy output based on the retrieved preview data, in response to a print job corresponding to the print data after the preview data has been output; and (ii) an instruction is received from the external terminal to release the preview data.

In another aspect, a resource collection part of a printer apparatus collects one or more of the printer resources from an external source through a network, where the printer resources collected by the resource collection part from the external source includes one or more of the following: fonts; overlays; logos; signatures; barcodes; letterhead; banner pages; forms.

In another aspect of this disclosure, a print driver is provided which includes a communication part configured to communicate with a specified printer, and a user interface part configured for user entry of a request for preview of a print job, for submission along with print data for the print job through the communication part to the specified printer, and configured to generate and output a preview request to the specified printer, receive preview data from the specified printer in response to the preview request and cause a preview image to be displayed based on the received preview data, on a display of the computer, wherein the preview image displayed based on the preview data received from the specified printer is a preview of a hardcopy image to be generated by the specified printer based on the print data.

In another aspect, preview data received from a specified printer is in a printer-independent format that is acceptable to a plurality of printing device types, and a user interface part of a terminal is configured to transmit the preview data, received from the specified printer, along with a print request to another printer, and wherein a hardcopy image generated by the another printer based on the preview data is substantially the same as the hardcopy image generated by the specified printer based on the print data.

In another aspect of this disclosure, a preview request is received along with print data from an external terminal, printer resources are collected in accordance with the received preview request and print data, and preview data is rendered and output based on the received print data and the collected printer resources applied to the print data, wherein the preview data output by the preview data generation part is in a printer-independent format that is acceptable to a plurality of printing devices, and images generated by the plurality of printers based on the preview data are substantially the same.

In another aspect of this disclosure, a user interface is provided at a terminal for user entry of a request for preview of a specific print job for a specified printer, a preview request is generated and communicated along with print data for the print job, from the terminal to the specified printer, preview data is received from the specified printer in response to the preview request, and a preview image is caused to be displayed based on the received preview data, on a display of the terminal, wherein the preview image displayed based on the preview data received from the specified printer is a preview of a hardcopy image to be generated by the specified printer based on the print data.

BRIEF DESCRIPTION OF THE DRAWINGS

The aforementioned and other features, aspects and advantages can be more readily understood from the following detailed description with reference to the accompanying drawings wherein.

DETAILED DESCRIPTION

Figure 1:
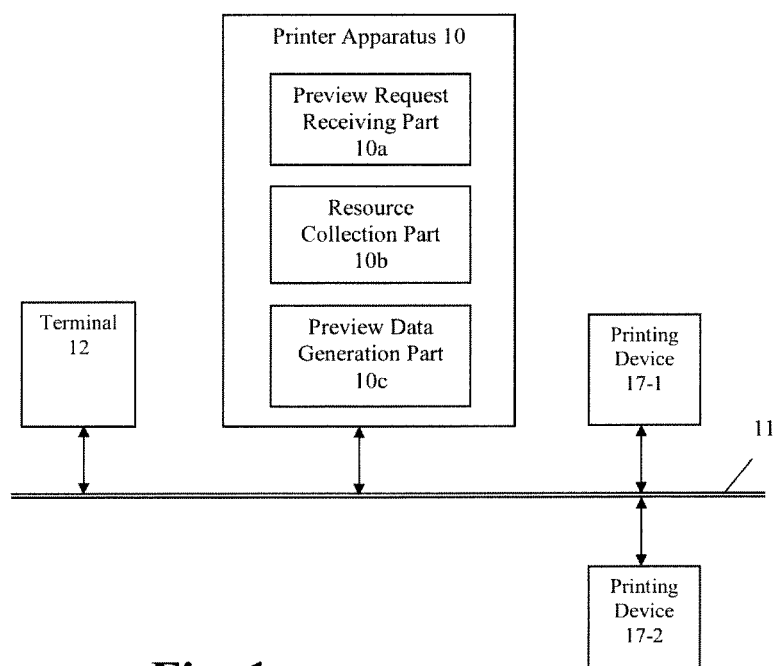
FIG. 1 shows a block diagram of a system, according to an exemplary embodiment of this disclosure.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. In addition, a detailed description of known functions and configurations will be omitted when it may obscure the subject matter of the present invention.

Referring now to the drawings, wherein like reference numerals designate identical or corresponding parts throughout the several views, FIG. 1 shows schematically a system 100 for previewing and submitting a print job, according to an exemplary embodiment of this disclosure.

System 100 includes printer apparatus 10, terminal 12 and a plurality of printing devices 17-1 and 17-2. The printer apparatus 10, terminal 12 and plurality of printing devices 17-1 and 17-2 are interconnected by a network 11.

The terminal 12 is configured with software allowing the terminal to generate a preview request and print data corresponding to a print job (of a document, for example), and transmit the preview request and print data to the network 11.

The terminal 12 may have a print driver configured to generate a print job of a document, as well as a preview request and print data corresponding to the print job, and submit the preview request and print data to a printing device such as the printer apparatus 10. For instance, a user of the terminal 12 creating and/or editing a document on a document processing application operating on the terminal 12 may invoke the print driver by designating the document for printing (such as by selecting "File" and "Print" in the document processing application). When the user then selects a "Print Preview" processing option, the print driver of the terminal may generate and transmit a preview request and print data corresponding to the document to the printer apparatus 10.

The print data corresponding to the document that is transmitted to the printer apparatus 10 may be variable data, such as ASCII text for example, and may be in the format of a textual or binary data stream. The print data may be in a Page Description Language (PDL) that describes the appearance of a printed page, where two popular PDLs are the PostScript (PS) format, and the Printer Command Language (PCL) format.

The printer apparatus 10 is configured to generate and return preview data, and comprises a preview request receiving part 10a, a resource collection part 10b, and a preview data generation part 10c.

The printer apparatus 10 may also be configured to generate a hardcopy image based on the print data received from the terminal or the preview data generated by the print apparatus itself. However, it is acceptable if the printer apparatus is not configured to generate a hardcopy image, so long as the printer apparatus can generate the preview data as described herein.

The preview request receiving part 10a is configured to receive a preview request along with print data from the external terminal 12. The preview request and associated print data may correspond to a print job, as discussed above.

The resource collection part 10b is configured to collect printer resources in accordance with the received preview request and print data.

The printer resources may be forms, logos, overlays, signatures, stamps, banners, printer fonts, barcodes, letterhead, color/monochrome settings and so forth.

The resource collection part 10b may collect the printer resources that are stored locally on the printer apparatus 10, from a memory or storage location in the printer apparatus 10. For example, certain printer-specific color fonts may be obtained locally from the printer apparatus 10.

Alternatively, if the required printer resources are not stored locally on the printer apparatus 10, the resource collection part 10b may collect the one or more of the printer resources from an external source through a network. For example, if the printer resource required for the particular print job is a logo of a specific corporation, such as a logo of the Ricoh corporation, then the resource collection part 10b may connect to online portal or website of the Ricoh corporation in order to obtain the logo printer resource. The resource collection part 10b may utilize a network communication device, for example, to connect to the portal/website over the internet or some other data network. The resource collection part 10b may in addition or instead utilize a wireless communication device connected to the printer apparatus 10 to connect to the portal/website over a wireless network and obtain the printer resource.

The preview data generation part 10c is configured to render preview data based on the received print data and the collected printer resources.

In particular, the preview data generation part 10c is configured to process the print data received by the preview request receiving part 10a, and apply all the printer resources collected by the resource collection part 10b to the print data in order to render the preview data.

For example, the printer resource collected by the resource collection part 10b may be a logo. A logo is a symbolic object (text, images and/or graphics) that is used as a background object for a printed document. The logo will typically contain static information such as descriptive labels of a corporation such as "Ricoh Corporation—Internal Correspondence". The preview data generation part 10c will process the print data received by the resource collection part 10b by applying the logo printer resource, in order to generate the preview data. Thus, the preview data describes a preview images that includes the applied logo and other printer resources.

At this point the Page Description Language (PDL) originally used by the driver to transmit the print request and print data is no longer relevant with respect to the preview data. Instead, the rendered preview data may be captured and converted to a viewable image format, such as a Portable Document Format (PDF) format, a bitmap (BMP) file format, a JPEG format, or many other formats well known in the art. Thus, the preview data may include image data (such as a binary stream of textual data) and an attached preview image file. Alternatively, the preview data generated by the preview data generation part 10c may itself be in a viewable image format.

The preview data generation part 10c is further configured to output the preview data, which was generated based on the received print data and the collected printer resources applied to the print data, as described above. The preview data may be transmitted directly to the terminal 12 or a print driver of the terminal 12. If the preview data is in a viewable image format, then the preview data may be presented to the user on a display part of the terminal 12. If the preview data includes an attached preview file, the printer apparatus 10 may transmit the preview image file to the external terminal 12, where the preview image file may be presented to the user on a display part of the terminal 12 (such as in the form of a thumbnail image presented in a print driver user interface operating on the terminal). The display part of the terminal 12 may correspond to a monitor or display screen of the terminal, for example.

While the transmission of the preview data may be directed to the terminal 12, it should be understood that the preview data may instead be transmitted to another terminal or a reviewer at some other location, via an email transmission for example, if this course of action was designated in the preview request transmitted from the external terminal to the preview request receiving part 10a.

According to an aspect of this disclosure, the preview data output by the preview data generation part 10c may be in a printer-independent format that is not dependent on the printer apparatus 10. In such a case, the preview data output by the preview data generation part 10c is acceptable as print data that may be provided to a plurality of printing devices (such as printing device 17-1 and 17-2) other than the printing apparatus 10, and images generated by the plurality of printers based on the preview data are substantially the same as each other (and substantially the same as images generated by the printing apparatus 10 itself).

Further, the preview data generation part 10c may be configured to perform all the data processing to the print data that is normally required to process the print data for transmission to a drum of the printer apparatus 10, so long as the preview data remains in a printer-independent format as described above. This includes compression, rasterizing, bitmap processing operations and so forth.

Thus, the preview data output by the preview data generation part 10c may include data configured to be transmitted to a print drum, and the images generated by the plurality of printers 17-1 and 17-2 based on the preview data are substantially the same as a hardcopy image generated by the printer apparatus 10 itself based on the preview data.

Thus, according to this exemplary embodiment, tools are provided for the efficient preview and submission of print jobs. Prior to actually submitting a print job of a document to a printer for printing a hardcopy image of the document, a preview request and print data corresponding to the print job of the document are sent to the printer. Thereafter, the printer applies various printer resources to the print data, in order to render preview data that is converted to a viewable format and presented back to the user as a preview.

Therefore, whereas the print previews of the prior art are generated entirely with an application or print driver operating on a terminal—which lack the ability to incorporate printer resources into the print preview, this disclosure provides a system and printer apparatus that generates a print preview using the actual printer resources of the printer apparatus. Thus, before the print job is actually submitted to the printer apparatus for printing out a hardcopy image of the document, the user is presented with an accurate preview of what the hardcopy image of the document will appear like, based on the printer resources of the printer apparatus such as forms, logos, overlays, signatures, barcodes, banners, etc., even if these resources do not exist on the user terminal.

Figure 2A:
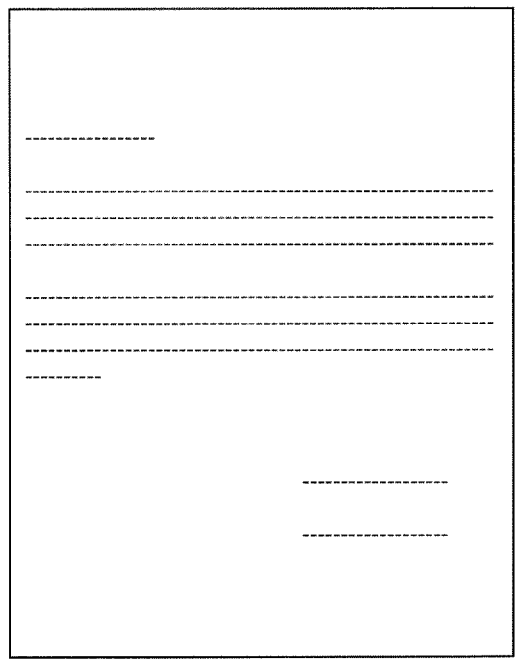
FIG. 2A shows an example of a conventional print preview image, according to the prior art.
Figure 2B:
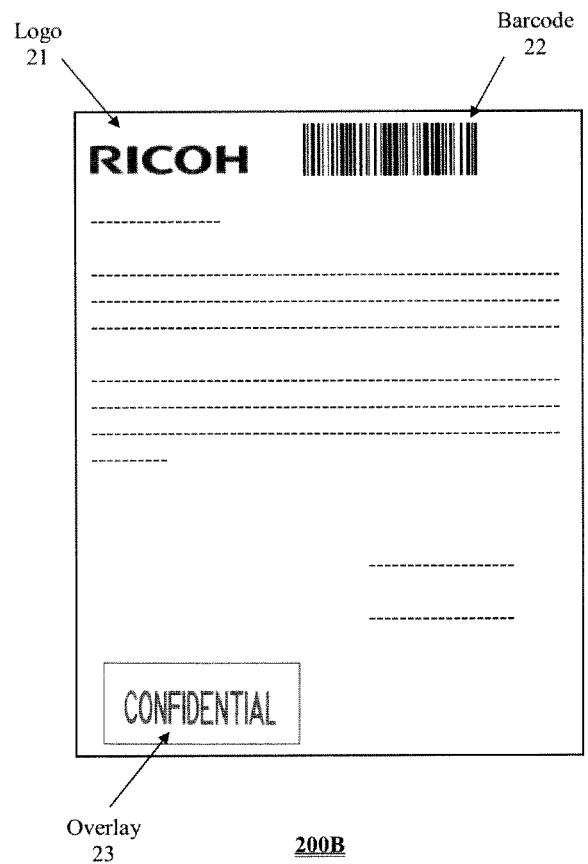
FIG. 2B shows an example of a print preview image, according to an aspect of this disclosure.

With reference to FIG. 2A for example, there is presented a conventional preview image 200A of a document that is generated on an application operating on a terminal, according to the prior art. The preview image is generated using only the resources of the terminal, and simply does not include aspects of the document that are generated based on the resources of the printer, such as logos, barcodes and overlays. In contrast, FIG. 2B presents a preview image 200B according to an aspect of this disclosure, and it will be seen that the preview image is generated using the printer resources of the printer apparatus, and thus accurately depicts a logo 21, barcode 22 and overlay 23.

Figure 3:
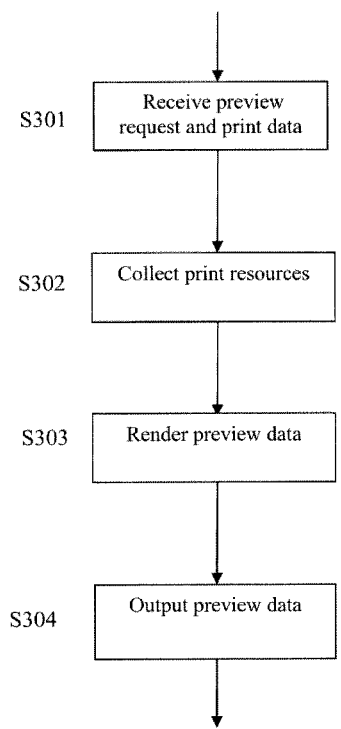
FIG. 3 shows a flow chart of a workflow on a printer apparatus side, in an exemplary embodiment.

Turning to FIG. 3, a flow chart is shown illustrating an example of a workflow on a printer apparatus side (such as printer apparatus 10 in FIG. 1).

Firstly, in step S301, the printer apparatus receives a preview request along with print data corresponding to a print job from an external terminal.

Thereafter, in step S302, the printer apparatus collects printer resources in accordance with the received preview request and print data.

The resource collection part 10b may collect one or more of the printer resources from an external source through a network. Alternatively, if the printer resources are stored locally on the printer apparatus, the printer apparatus will collect the printer resources from the local storage part or memory part of the printer apparatus. The printer resources collected by the apparatus from either the external source of the local storage part include one or more of the following: fonts; overlays; logos; signatures; barcodes; letterhead; banner pages; forms.

In step S303, the printer apparatus renders preview data based on the received print data and the collected printer resources applied to the print data.

Finally, in step S304, the printer apparatus outputs the preview data rendered in S303. The preview data may be transmitted to a terminal, or as an email to a reviewer at a designated email address.

In particular, the preview data output by the printer apparatus is in a printer-independent format that is acceptable to a plurality of printing devices, and images generated by the plurality of printers based on the preview data are substantially the same.

Further, the preview data output by the preview data generation part 10c includes data may be configured to be transmitted to a print drum, and the images generated by the plurality of printers based on the preview data are substantially the same as a hardcopy image generated by the printer apparatus 10 based on the preview data.

The preview data output by the preview data generation part 10c may be in a viewable image format, or alternatively, the preview data may include an attached preview image file.

This may be advantageous in the case that only a specific printer or specific type of printer has the printer resources necessary to perform a print job of a given document. This specific printer may only be present in one office of a corporation, or may only be present in the corporation's office headquarters in one country. According to conventional systems, the only way to view the appearance of a printout using the resources of the printer is to actually have the print job be performed by the printer. That is, the print job may have to be submitted to the office having that printer, and then the hardcopy print out must be scanned and faxed/mailed/emailed in order to have an accurate understanding of the appearance of the hardcopy printout.

Thus, according to an aspect of this disclosure, the printer apparatus generates previews of hardcopy printouts of print jobs that use printer resources, after the print job is processed on the printer but before the hardcopy printout is obtained. Even if a terminal does not have the printer resources needed to render an accurate preview image, like overlays, fonts or database entries, the returned image from the printer will be as visually close as possible to what the actual hardcopy printout image will look like. For example, if a color PowerPoint (PPT) presentation is sent to a monochrome printer, the returned preview image will be in monochrome.

According to another exemplary embodiment, it is possible that a print driver on the terminal may download at least one printer resource (such as the logo 21, barcode 22 or overlay 23 depicted in FIG. 2B) from the printer apparatus (subject to various security and authorization protocols) and perform the rendering on the terminal itself to generate the preview data locally, provided the print driver or another application that can accurately render the job exists on the terminal.

Figure 4:
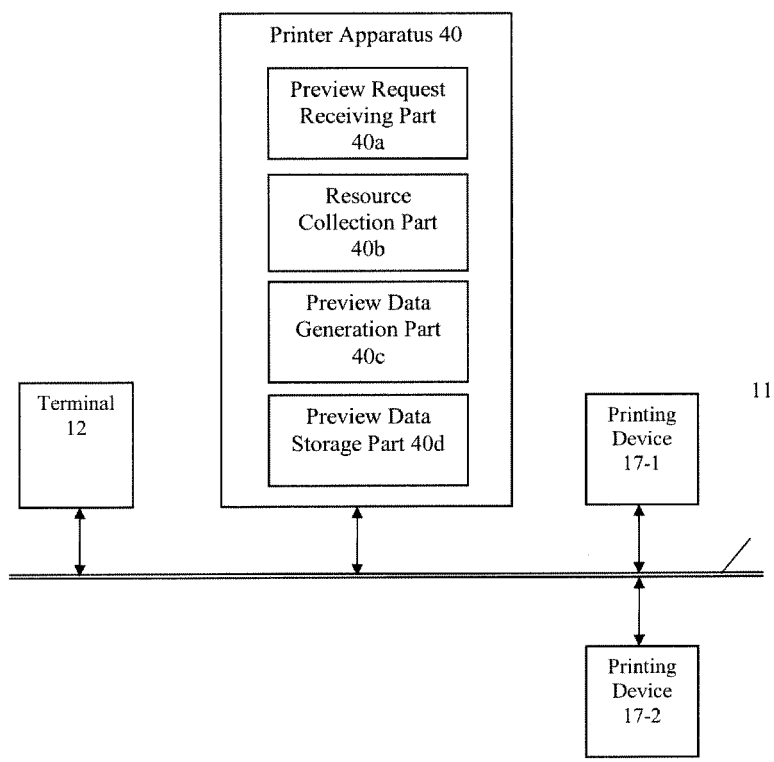
FIG. 4 shows a block diagram of a system, according to another exemplary embodiment of this disclosure.

FIG. 4 shows schematically a system 400 for previewing and submitting a print job, according to another exemplary embodiment of this disclosure.

System 400 includes printer apparatus 40, terminal 12 and a plurality of printing devices 17-1 and 17-2 interconnected by a network 11.

The terminal 12 is substantially the same as terminal 12 of FIG. 1, and is configured with software allowing the terminal to generate a preview request and print data corresponding to a print job, and transmit the preview request and print data to the network 11. Likewise, the plurality of terminals 17-1 and 17-2 are substantially the same as terminals 17-1 and 17-2 of FIG. 1.

The printer apparatus 40 is configured to generate and return preview data, and comprises a preview request receiving part 40a, a resource collection part 40b, a preview data generation part 40c, and preview data storage part 40d.

The preview request receiving part 40a, resource collection part 40b, and preview data generation part 40c are substantially similar to the preview request receiving part 10a, resource collection part 10b, and preview data generation part 10c of the printer apparatus 10 depicted in FIG. 1.

The preview data storage part 40d is configured to store the preview data rendered and output by the preview data generation part 40c. Thereafter, when the printer apparatus 40 receives a print job instruction corresponding to the print data received by the request receiving part 40a, after the preview data has been rendered and output, the printer apparatus retrieves the preview data stored in the preview data storage part 40d and generates a hardcopy printout image based on the stored preview data, in response to the received print job instruction.

Thus, if the preview data generated by the preview data generation part 40c is stored at the printer apparatus, in accordance with what will be described herein as a 'Store Preview Data' policy, then when a print job instruction is submitted to the printer apparatus from a terminal after the preview data has been output, the print job instruction from the terminal does not have to include preview data being "transmitted back" to the printer apparatus. If this was not the case, then any print job instruction from the terminal will have to include the preview data that was previously transmitted from the printer apparatus 40 to the terminal 12.

According to this exemplary embodiment, the preview data output by the preview data generation part 40c is stored in the preview data storage part 40d until an instruction to dismiss the print job and/or delete the preview data from the preview data storage part 40d is received. Thus, the stored preview data may be reused, if a similar print job instruction corresponding to the same document is submitted to the printer apparatus 40 at some future time.

Alternatively, under another embodiment of this disclosure, the preview data stored in the preview data storage part 40d is also automatically deleted after the printer apparatus retrieves the stored preview data, in response to a print job instruction received from the terminal apparatus.

In this case, the preview data stored in the storage part is deleted only after at least one of the following events occur: (i) the printer apparatus retrieves the stored preview data and generates a hardcopy output based on the retrieved preview data, in response to a print job corresponding to the print data after the preview data has been output; and (ii) an instruction is received from the external terminal to dismiss the print job and/or delete the preview data.

Figure 5A:
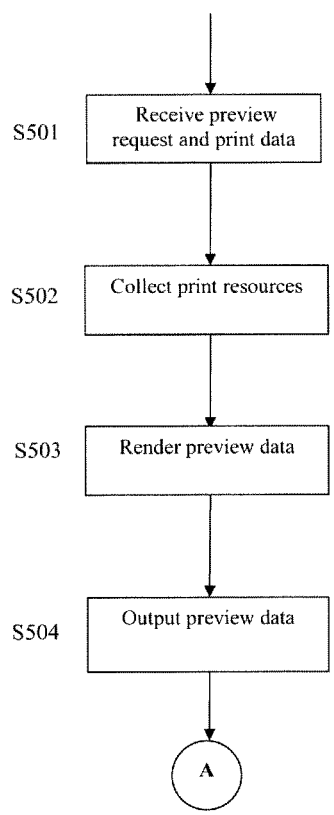
FIG. 5 shows a flow chart of a more detailed workflow on a printer apparatus side, in another exemplary embodiment.
Figure 5B:
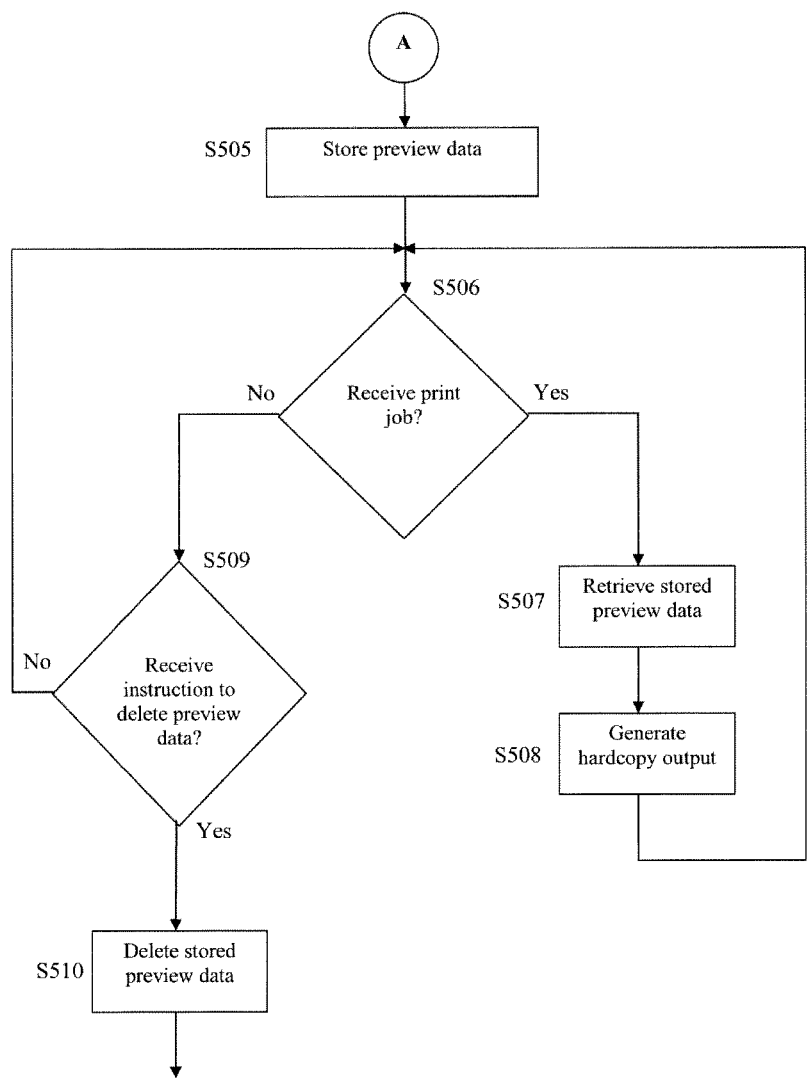

In FIGS. 5A and 5B, a flow chart is shown illustrating an example of a more detailed workflow on a printer apparatus side (such as the printer apparatus 40 in FIG. 4).

Steps S501 through S504 are substantially similar to steps S301 through S304, respectively.

In step S505, the printer apparatus stores the preview data output in S504 locally in a storage part or memory part of the printer apparatus, in accordance with a Store Preview Data policy.

In step 506, the printer apparatus determines if a print job (i.e. print job instruction to perform a print job and produce a hardcopy image) has been received, the print job corresponding to the print data received in S501.

If it is determined that a print job has been received (S506, yes), then the printer apparatus retrieves the stored preview data (S507) and generates a hardcopy output based on the retrieved preview data (S508). After step S508, the workflow returns to step S506, and the apparatus again determines if a print job has been received.

If it is determined that a print job has not been received (S506, no), then the printer apparatus determines if an instruction is received from the external terminal to delete the stored preview data and/or dismiss the print job, in step S509.

If it is determined that an instruction to delete the stored preview data and/or dismiss the print job is received from the external terminal (S509, yes), then the printer apparatus deletes the stored preview data and/or dismisses the print job, in step S510. The workflow is then completed.

If it is determined than an instruction to delete the stored preview data and/or dismiss the print job is not received from the external terminal (S509, no), then the workflow returns to S506, and the apparatus again determines if a print job has been received.

According to this exemplary embodiment, the preview data output by the printer apparatus in S504 is stored at the printer apparatus in S505, until an instruction to dismiss the print job and/or delete the preview data from the preview data storage part 40d is received. Thus, the stored preview data may be reused, if a similar print job instruction corresponding to the same document is submitted to the printer apparatus at some future time.

Alternatively, under another embodiment of this disclosure, the preview data stored at the printer apparatus is automatically deleted after the printer apparatus retrieves the stored preview data, in response to a print job received from the terminal apparatus. That is, after the printer apparatus generates the hardcopy output in S508, the printer apparatus deletes the stored preview data, and the workflow is completed.

In this case, the preview data stored in the storage part is deleted only after at least one of the following events occur: (i) the printer apparatus retrieves the stored preview data and generates a hardcopy output based on the retrieved preview data, in response to a print job corresponding to the print data after the preview data has been output; and (ii) an instruction is received from the external terminal to delete the preview data and/or dismiss the print job.

According to another aspect of this disclosure, the printer apparatus is provided with various security features to ensure the safety and security of the print data received from the terminal and the print preview data generated by the printer apparatus.

Firstly, the print data and print request transmitted from the terminal to the printer apparatus may be encrypted, and the printer apparatus may have decryption parts to decrypt the print request and print data. This ensures that the print data will not be viewable to third parties if the print data should be transmitted to or intercepted by the third parties. Such security features may be important if the print data relates to confidential information, data for printing monetary instruments and checks, etc. . . .

Alternatively, or in addition, the printer apparatus may have to transmit an access code to the terminal, in order for the terminal to authenticate the printer apparatus before transmitting the printer request and print data to the printer apparatus. Only if the access code of the printer apparatus is authenticated will the terminal transmit the printer request and print data to the printer apparatus.

Likewise, when the printer apparatus transmits the preview data to the terminal, the preview data may be encrypted so that only the terminal may properly decrypt the preview print data. Alternatively, or in addition, the terminal may have to transmit an access code to the printer apparatus, in order for the printer apparatus to authenticate the terminal before transmitting the preview print data to the terminal. Only if the access code of the terminal is authenticated will the printer apparatus transmit the preview print data to the printer apparatus.

Figure 6:
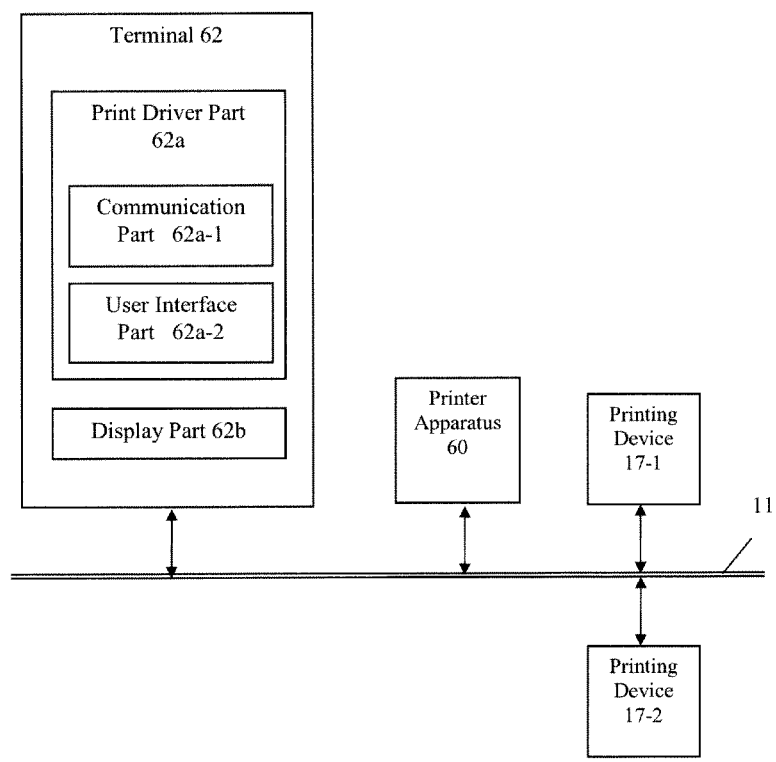
FIG. 6 shows a block diagram of a system, according to another exemplary embodiment of this disclosure.

Turning now to FIG. 6, there is shown schematically a system 600 for previewing and submitting a print job, according to another exemplary embodiment of this disclosure.

System 600 includes a terminal 62, a printer apparatus 60, and a plurality of printing devices 17-1 and 17-2 interconnected by a network 11.

The printing devices 17-1 and 17-2 may be substantially similar to the printing devices 17-1 and 17-2 depicted in FIG. 1. The printer apparatus 60 may be substantially similar to the printer apparatus 10 depicted in FIG. 1, or may be some other type of printing apparatus configured to interact with the terminal 62 as discussed below.

The terminal 62 is configured with print driver software allowing the terminal to generate a preview request, and the terminal 62 includes a print driver part 62a and a display part 62b.

The print driver part 62a includes a communication part 62a-1 and a user interface part 62a-2. The mechanisms and processes of the printer driver part 62a may be embodied in a computer-based product or computer program that may be tangibly stored on a non-transient computer readable storage medium and include instructions that can be used to program a computer to perform a process in accordance with this specification. This storage medium can include, but is not limited to, any type of disk including floppy diskettes, optical disks, magneto-optical disks, ROMs, RAMs, EPROMs, EEPROMs, FLASH memory, or any type of media suitable for storing electronic instructions.

The communication part 62a-1 is configured to communicate with a specified printer, such as printer apparatus 60. The communication part 62a-1 may also be configured to communicate with the plurality of printing devices 17a-1 and 17a-2. The communication part 62a-1 may be connected to a network communications processor that performs two-way communication over the network 11. The communication part 62a-1 may in addition, or instead, connect to a wireless communication part that communicates over a wireless network.

User interface part 62a-2 is configured for user entry of a request for a preview of a print job. The user interface part 62a-2 is further configured to generate print data and a preview request corresponding to the print job, and output the preview request and print data to a specified printer, via the communication part 62a-1. The specified printer may be printer apparatus 60, for example. The user interface part 62a-2 then receives preview data from the specified printer in response to the preview request, via the communication part 62a-1, and causes a preview mage to be displayed on the display part 62b of the terminal 62, based on the received preview data. The display part 62b of the terminal 62 may be, for example, a monitor or display screen of the terminal 62.

The preview image displayed based on the preview data received from the specified printer is a preview of a hardcopy image, to be generated by the specified printer based on the print data transmitted by the terminal 62.

The preview data may be based on printer resources that are available to the specified printer and that are not present on the terminal 62. Further, the preview data received from the specified printer in a printer-independent format that is acceptable to a plurality of printing device types. Thus, a hardcopy image generated by another printing device (such as printing device 17-1 or 17-2) based on the preview data is substantially the same as the hardcopy image generated by the specified printer 60 based on the print data.

The user interface part 62*a*-2 is configured for user entry of a first instruction to print the print job without submitting the print data to the specified printer again. The user interface part 62*a*-2 is also configured for user entry of a second instruction to dismiss the print job, while or after the preview of the print job is displayed on the display part 62*b* of the terminal 62.

The user interface part 62*a*-2 is also configured for user entry of an instruction to submit the preview data and a print request to another printer, that is different from the specified printer from which the preview data was received, in order to have the other printer print the print job based on the preview data. For example, the preview data may be transmitted to one of the printing devices 17-1 and 17-2. The user interface part 62*a*-2 is further configured for user entry of an instruction to release (i.e. print) the print job from the specified printer.

According to another aspect of this disclosure, the preview data received from the specified printer includes a preview image file, and the user interface part 62*a*-2 is further configured for user entry of an instruction to save or archive the preview image file.

According to another aspect of this disclosure, the user interface part 62*a*-2 is configured to receive user edit instructions that instruct the print driver part 62*a* to edit the preview data received from the specified printer, by removing selected ones of the printer resources (logos, forms, layouts) for example. The print driver 62*a* processes the preview data received from the specified printer, based on the user edit instructions.

Figure 7:
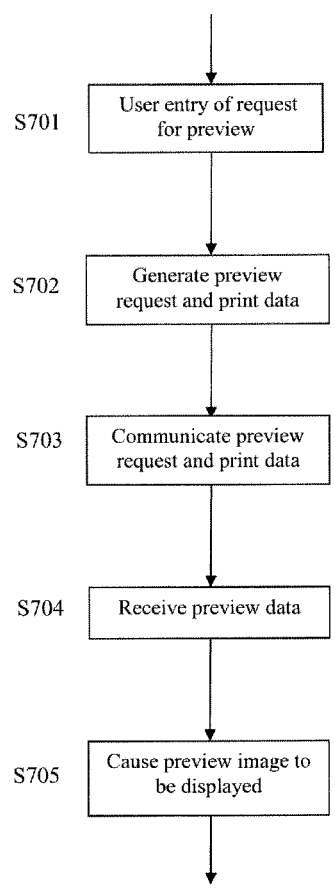
FIG. 7 shows a flow chart of a workflow on a terminal side, in another exemplary embodiment.

In FIG. 7, a flow chart is shown illustrating an example of a workflow on print driver side (such as the print driver 62*a* of terminal 62, depicted in FIG. 6).

In step S701, the print driver provides a user interface and the print driver receives, via the user interface, user entry of a request for a preview of a print job. The request is designated for submission to a specified printer.

Then in step S702, the print driver generates a preview request and print data for the print job. In step S703, the print driver outputs the preview request generated in S702, along with the print data for the print job, to the specified printer.

Thereafter, in step S704, the print driver receives preview data from the specified printer in response to the preview request transmitted in S703.

Finally, in step S705, the print driver causes a preview image to be displayed on a display of a terminal, based on the preview data received in S704.

The preview image displayed based on the preview data received from the specified printer, is a preview of a hardcopy image to be generated by the specified printer based on the print data transmitted in S703. The preview data is generated based on printer resources that are available to the specified printer and that are not present on the terminal.

Figure 8A:
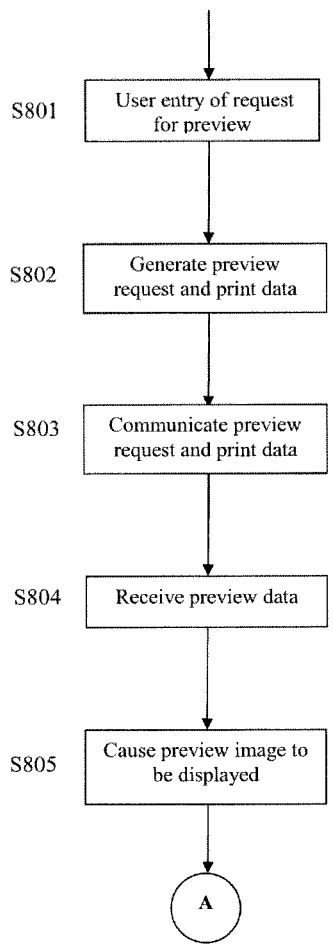
FIG. 8 shows a flow chart of a more detailed workflow on a terminal side, in another exemplary embodiment.
Figure 8B:
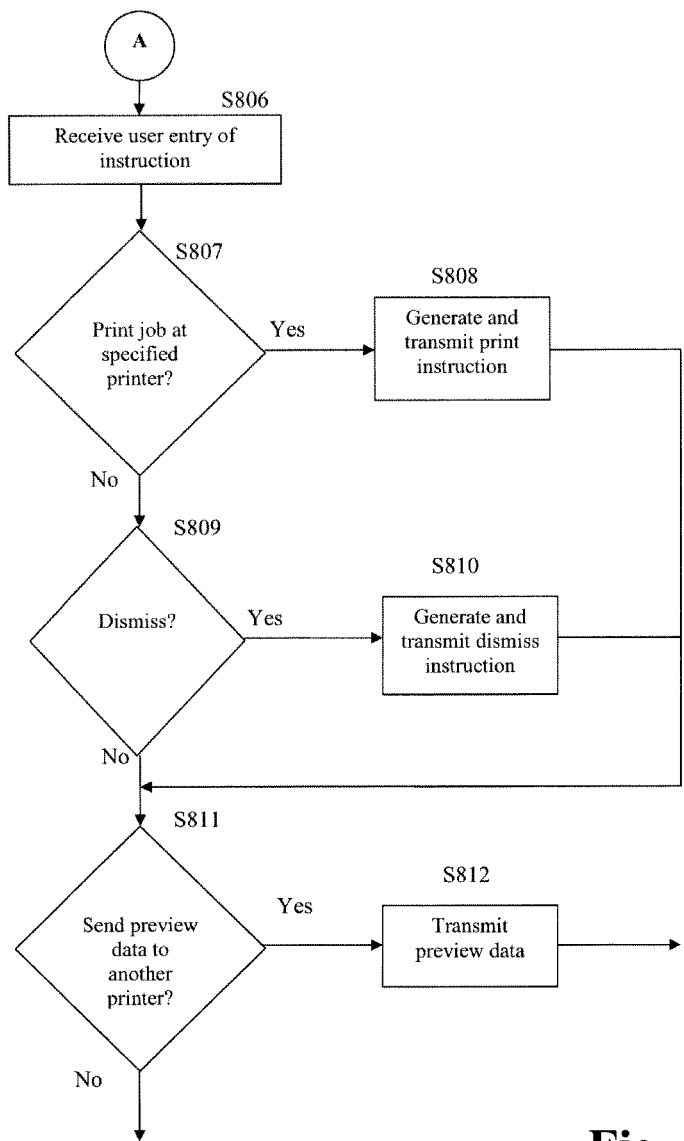

In FIG. 8, a flow chart is shown illustrating a more detailed example of a workflow on a print driver side (such as print driver part 62*a* of the terminal 62, depicted in FIG. 6).

Steps S801 through S805 are substantially similar to S701 through S705 depicted in FIG. 7.

In step S806, the print driver receives a user entry of a command or instruction, via a user interface of the print driver. In step S807, the print driver determines if the user instruction is a print job instruction to print the print job at the specified printer.

If it is determined that the user instruction is a print job instruction to print the print job at the specified printer, thereby approving the release of the print job (S807, yes), then the print driver transmits a print request to the specified printer to print the print job, in S808. The workflow then proceeds to S811.

If it is determined that the user instruction is not a print job instruction to print the print job at the specified printer (S807, no), then the print driver determines if the user command is an instruction to dismiss the print job and/or delete any preview data stored at the specified printer, in S809.

If it is determined that the user instruction is an instruction to dismiss the print job (S809, yes), then the print driver transmits a request to the specified printer to dismiss the print job and/or delete any preview data stored at the specified printer, in S810. The workflow then proceeds to S811.

If it is determined that the user instruction is not an instruction to dismiss the print job (S809, no), then the workflow proceeds to S811. In S811, the print driver determines if the user instruction is an instruction to submit the preview data to another printer that is different from the specified printer from which the preview data was received, in order to have the other printer perform the print job based on the preview data.

If the determination in S811 is yes, then the print driver transmits the preview data to the other printer, in S812, and the workflow is completed. If the termination in S811 is no, then the workflow is completed.

Although not shown, it is possible that after the step (S811, no) and/or S812, the user interface of the print driver may prompt the user as to whether the user desires to save or archive the preview data and any associated preview image file for future use. Thus, the preview data and/or preview image file may be reused to submit another print job to the specified printer or another printer at a later time.

While the examples shown in FIG. 1, FIG. 4 and FIG. 6 include one terminal and one printer apparatus, it should be appreciated that such numbers of terminals and printer apparatuses are arbitrary and are selected as an example in order to facilitate discussion, and that the subject matter of this disclosure can be implemented in a system including one or more printer apparatuses and terminals. Other devices, such as scanners, printers and multi-function devices (MFDs) may also be connected to the network 11, as is well known in the art.

The terminal 12 and 62 can be any computing device, including but not limited to a personal, notebook or workstation computer, a kiosk, a PDA (personal digital assistant), a MFD (multi-function device), a server, a mobile phone or handset, another information terminal, etc., that can communicate through the network 11 with other devices.

The printer apparatuses 10, 40 and 60, and each of the printing devices 17 can be any image forming apparatus or image output apparatus configured to output a hardcopy printout of a print job. For example, the printer apparatus or printing device may be a printer, a copier machine, a MFD (multi-function device), a MFP (multi-function product), and so on.

The network 11 can include one or more of a secure intranet or extranet local area network, a wide area network, any type of network that allows secure access, etc., or a combination thereof. Further, other secure communications links (such as a virtual private network, a wireless link, etc.) may be used as well in the network 11. In addition, the network 1 preferably uses TCP/IP (Transmission Control Protocol/Internet Protocol), but other protocols can also be used. How devices can connect to and communicate over the network 11 is well-known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

Figure 9:
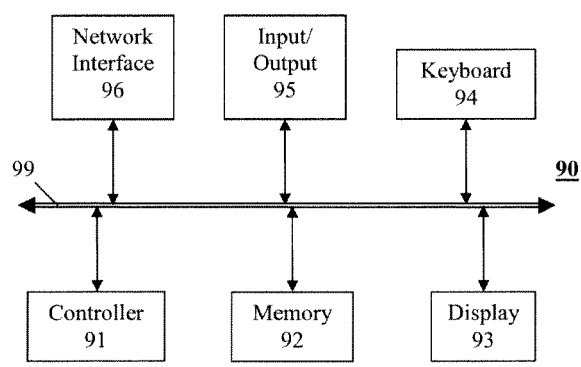
FIG. 9 shows a block diagram of an exemplary configuration of a terminal.

An example of a configuration of the terminal 12 and 62 (for example, as a computer) is shown schematically in FIG. 9. In FIG. 9, computer 90 includes a controller (or central processing unit) 91 that communicates with a number of other components, including memory 92, display 93, keyboard (and/or keypad) 94, other input/output (such as mouse, touchpad, stylus, microphone and/or speaker with voice/speech interface and/or recognition software, etc.) 95, and network interface 96, by way of internal bus 99.

The memory 92 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.].

The network interface 96 provides a connection (for example, by way of an Ethernet connection or other network connection which supports any desired network protocol such as, but not limited to TCP/IP, IPX, IPX/SPX, or NetBEUI) to network 11.

A user interface is provided and is configured through software natively or received through a network connection, to allow the user to access electronic data or content on the terminal and/or via the network, interact with network-connected devices and services (such as the printer apparatuses 10, 40 or 60), enjoy other software-driven functionalities, etc. For example, a browser (such as Internet Explorer™, Netscape Navigator™, a proprietary browser, etc.) may be provided on the terminal so that a user of the terminal can use browsing operations to communicate with the printer apparatuses 10, 40 or 60, and access other data or content.

Additional aspects or components of the computer 90 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

As mentioned above, the terminals 12 or 62 are not limited to a personal computer, but can be manifested in a form of any of various devices that can be configured to communicate over a network and/or the Internet.

Figure 10:
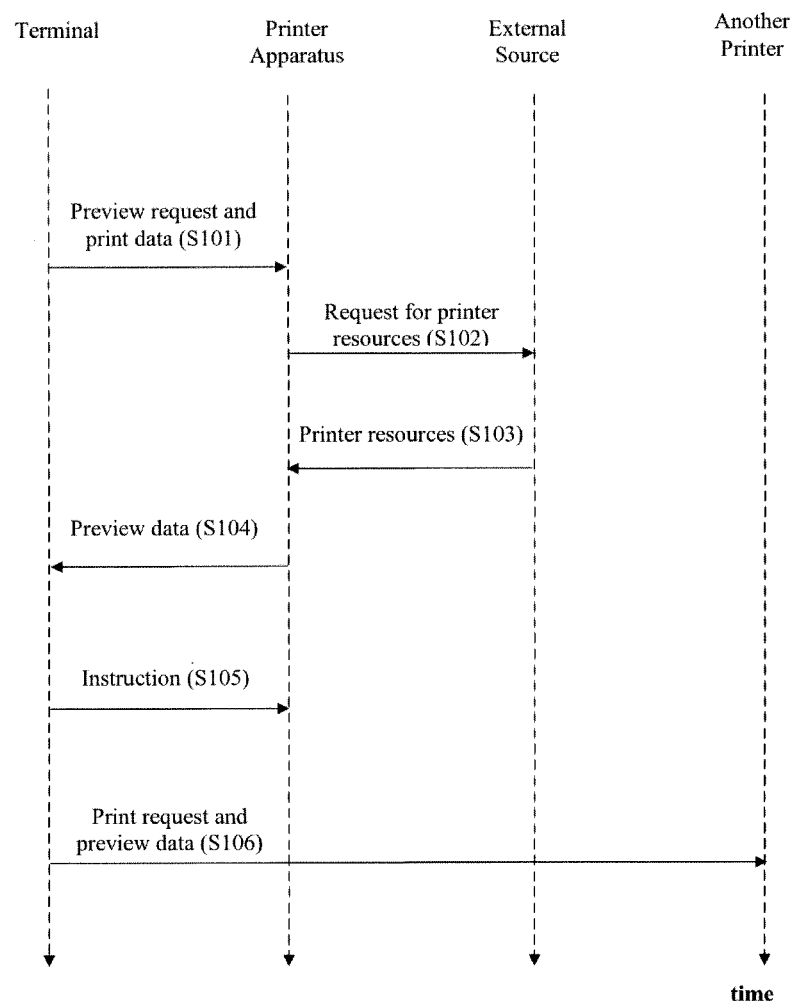
FIG. 10 shows a schematic view of an example of data flow in an exemplary embodiment.

Turning now to FIG. 10, a schematic view of an example of data flow in an exemplary embodiment is presented.

Firstly, in S101, a terminal transmits a preview request and print data to a printer apparatus. According to an aspect of this disclosure, the preview request and print data correspond to a print job (of a document, for example), but the print job itself for output of a hardcopy image is not yet finally submitted to the printer apparatus at this time.

After the printer apparatus receives the preview request along with the print data from the external terminal in S101, the printer apparatus collects printer resources in accordance with the received preview request and print data. The printer resources may be forms, logos, overlays, signatures, banners, printer fonts, barcodes, letterhead, color/monochrome settings and so forth.

More specifically, in S102 the printer apparatus transmits a request to an external source for the printer resources in accordance with the preview request and the print data received in S101. In response, the printer apparatus receives and collects the printer resources from the external source in S103. (Alternatively, if the required printer resources are stored locally on the printer apparatus, the printer apparatus may simply collect the printer resources from a memory or storage location of the printer apparatus for example, and S102 and S103 may be omitted).

Thereafter, the printer apparatus renders preview data by processing the print data received in S101, based on the print request received in S101 and the printer resources collected in S103. In S104 the printer apparatus outputs (i.e. transmits) the preview data to the terminal. The printer apparatus may also store the generated preview data locally on the printer apparatus, if the printer apparatus is operating under a Store Preview Data policy and if the printer apparatus has the proper resources to store the preview data.

As described elsewhere in this disclosure, the preview data output by the printer apparatus is in a printer-independent format that is acceptable to a plurality of printing devices, and images generated by a plurality of printing devices based on the preview data are substantially the same.

Further, the preview data output by the printer apparatus may include data configured to be transmitted to a print drum, and the images generated by the plurality of printers based on the preview data are substantially the same as a hardcopy image generated by the printer apparatus itself based on the preview data.

The preview data may be in the form of printer data or a stream of binary textual data. In this case, the preview data may include a preview image file in a viewable format, such as a PDF format, a BMP format, a JPEG format, and so forth. Alternatively, the preview data itself may be in a viewable format, such as the afore-mentioned PDF format, BMP format, JPEG format, and so forth.

While the transmission of the preview data is depicted in FIG. 10 as being directed to the terminal that is the source of the preview request and print data in S101, it should be understood that the preview data may instead be transmitted to another terminal or a reviewer at some other location, via an email transmission for example, if this course of action was designated in the preview request that was transmitted from the external terminal to the printer apparatus in S101.

In S105, the terminal transmits an instruction to the printer apparatus, where the instruction is based on user input from a user of the terminal apparatus. In particular, the instruction may be one of two types of instructions. Firstly, the instruction may be a print job (or an instruction to perform a print job), where the print job corresponds to the print data that was transmitted from the terminal to the printer apparatus in S101. After the printer apparatus receives the print job instruction in S104, the printer apparatus retrieves the stored preview data and generates a hardcopy output based on the retrieved preview data. The printer apparatus may delete the stored preview data (although it is possible that the printer apparatus may continue to store the preview data, in case the terminal transmits another print job instruction for the same print job in the future).

If the preview data was not stored locally at the printer apparatus, because the printer apparatus is not operating under a Store Preview Data policy, then note that any print job instruction transmitted in S105 may have to include the preview data that was transmitted from the printer apparatus to the terminal in S104.

The second type of instruction that may be transmitted from the terminal to the printer apparatus in S105 may be an instruction to delete the preview data stored at the printer apparatus and/or dismiss the print job corresponding to the preview request and print data that was transmitted to the printer apparatus in S101. In such as case, the printer apparatus will delete the preview data (if the preview data was stored locally in the printer apparatus under a Store Preview Data policy) and/or the printer apparatus will dismiss the print job, depending on the exact nature of the instruction.

In S106, the terminal may transmit the preview data, received from the printer apparatus in S104, along with a print request to another printer, different from the printer apparatus. As discussed above, since the preview data output by the printer apparatus is in a printer-independent format that is acceptable to a plurality of printing devices, and images generated by the plurality of printers based on the preview data are substantially the same.

As described elsewhere in this disclosure, various security features may be applied to the transmissions of data depicted in FIG. 10, in order to ensure the security of the data. For example, all data transmission of instructions, print jobs, print data, preview data, printer resources etc. . . . may be encrypted, so that only authorized devices such as the terminal, printer apparatus, external source and other designated printers may utilize the data.

In addition, whenever there is any data transmitted from entity A to entity B, it is possible to implement a security policy that entity A must transmit an access code to entity B that is authenticated by entity B, and/or entity B must transmit an access code to entity A that is authenticated by entity A. This may ensure the security of the information being transmitted. For example, if preview data is being transmitted from the printer apparatus to the terminal in S104 corresponding to highly confidential information, then the printer apparatus may verify that the terminal is authorized to receive the confidential information, while the terminal may verify that the source of the confidential information is in fact the trustworthy printer apparatus itself and not an unauthorized third party.

The above-mentioned specific embodiments are illustrative, and many variations can be introduced on these embodiments without departing from the spirit of the disclosure or from the scope of the appended claims. For example, elements and/or features of different examples and illustrative embodiments may be combined with each other and/or substituted for each other within the scope of this disclosure and appended claims.

What is claimed is:

1. A printer apparatus configured to generate and return preview data, comprising:
    a preview request receiving part configured to receive a preview request along with print data from an external terminal;
    a resource collection part configured to collect printer resources in accordance with the received preview request and print data; and
    a preview data generation part configured to render and output preview data based on the received print data and the collected printer resources applied to the print data,
    wherein the preview data output by the preview data generation part is in a printer-independent format that is acceptable to a print drum of any of plural printing devices, and images generated by the plural printing devices based on the preview data in the printer-independent format are substantially the same, and
    wherein when the external terminal receives the preview data output by the preview data generation part of the printer apparatus in response to the preview request of the external terminal and transmits the preview data along with a print request to another printer, different from the printer apparatus, the print drum of said another printer generates a hardcopy printout image based on the preview data in the printer-independent format and the hardcopy printout image generated by the print drum of said another printer is substantially the same as a hardcopy image generated by the printer apparatus based on the preview data in the printer-independent format.

2. The printer apparatus of claim 1, wherein the preview data includes a preview image file and the printer apparatus transmits the preview image file to the external terminal.

3. The printer apparatus of claim 2, further comprising a preview data storage part, wherein
    the preview data output by said preview data generation part is stored in the preview data storage part of the printer apparatus until an instruction to delete the preview data from the preview data storage part is received, and
    when the printer apparatus receives, after the preview data has been output, the print job corresponding to the print data, the printer apparatus retrieves the stored preview data and generates a hardcopy output based on the retrieved preview data, in response to the received print job.

4. The printer apparatus of claim 2, further comprising a preview data storage part,
    wherein the preview data output by said preview data generation part is stored in the preview data storage part, and
    wherein the preview data stored in the storage part is deleted only after at least one of the following events occur:
        (i) the printer apparatus retrieves the stored preview data and generates a hardcopy output based on the retrieved preview data, in response to the print job corresponding to the print data after the preview data has been output; and
        (ii) an instruction is received from the external terminal to release the preview data.

5. The printer apparatus of claim 1, wherein said resource collection part collects one or more of the printer resources from an external source through a network.

6. The printer apparatus of claim 5, wherein the printer resources collected by said resource collection part from the external source includes one or more of the following: overlays; logos; signatures; barcodes; letterhead; banner pages; forms, and
    wherein the preview data output by the preview data generation part reflects the print data with the collected printer resources applied thereto.

7. The printer apparatus of claim 1, wherein the preview data output by said preview data generation part is in a viewable image format.

8. The printer apparatus of claim 1, wherein the preview data output by said preview data generation part is transmitted to an email address designated in the preview request received by said preview request receiving part.

9. The printer apparatus of claim 1, wherein the printer resources used to render the preview data include print resources collected from within the printer apparatus as well as resources that are collected from a source external to the printer apparatus.

10. A non-transitory computer readable medium tangibly embodying instructions for a print driver executable by a computer in connection with print functionalities, said print driver comprising:
    a communication part configured to communicate with a specified printer; and
    a user interface part configured for user entry of a request for preview of a print job, for submission along with print data for the print job through the communication part to the specified printer, and configured to generate and output a preview request to the specified printer, receive preview data from a preview data generation part of the specified printer in response to the preview request and cause a preview image to be displayed based on the received preview data, on a display of the computer, wherein the preview image displayed based on the preview data received from the specified printer is a preview of a hardcopy image to be generated by the specified printer based on the print data, and wherein when the print driver receives a print instruction corresponding to the print data via the user interface part, the print driver causes the preview data to be transmitted in a printer-independent format that is acceptable to a print drum of any of plural printing devices, along with a print request, to another printer, different from the specific printer from which the preview data was received, to cause the print drum of said another printer to generate a hardcopy printout image by utilizing the preview data in the printer-independent format, and the hardcopy printout image generated by the print drum of said another printer is substantially the same as that generated by the print drum of any other of the plural printing devices, based on the preview data in the printer-independent format.

11. The computer readable medium of claim 10, wherein the preview data is based on printer resources that is available to the specified printer and that is not present on the computer executing the print driver instructions.

12. The computer readable medium of claim 10, wherein said user interface part is further configured for user entry of any one of a first instruction to print the print job without submitting the print data to the specified printer again, and a second instruction to dismiss the print job, while or after the preview of the print job is displayed on the display of the computer.

13. The computer readable medium of claim 10, wherein the preview data includes a preview image file, and said user interface part is further configured for user entry of an instruction to save or archive the preview image file.

14. The computer readable medium of claim 10, wherein said user interface part is further configured for user entry of an instruction to release the print job from the specified printer.

15. The computer readable medium of claim 10, wherein the user interface part receives user edit instructions that instruct the print driver to edit the preview data received from the specified printer, and the print driver processes the preview data received from the specified printer, based on the user edit instructions.

16. The computer readable medium of claim 10, wherein the specified printer transmits the printer resources to the print driver, and the print driver generates the preview of the hardcopy image to be generated by the specified printer, based on the received printer resources.

17. A method for generating a preview of a print job, said method comprising:

providing a user interface at a terminal for user entry of a request for preview of a specific print job for a specified printer;

generating and communicating a preview request along with print data for the print job, from the terminal to the specified printer;

receiving preview data from the specified printer in response to the preview request and causing a preview age to be displayed based on the received preview data, on a display of the terminal, wherein the preview image displayed based on the preview data received from the specified printer is a preview of a hardcopy image to be generated by the specified printer based on the print data; and causing the preview data to be transmitted in a printer-independent format that is acceptable to a print drum of any of plural printing devices, along with a print request, to another printer, different from the specific printer from which the preview data was received, to cause the print drum of said another printer to generate a hardcopy printout image by utilizing the preview data in the printer-independent format and the hardcopy printout image generated by the print drum of said another printer is substantially the same as that generated by the print drum of any other of the plural printing devices, based on the preview data in the printer-independent format, upon receiving a print instruction corresponding to the print data via the user interface.

* * * * *